United States Patent
Hong et al.

(10) Patent No.: US 8,478,351 B2
(45) Date of Patent: *Jul. 2, 2013

(54) MOBILE TERMINAL HAVING TOUCH INPUT DEVICE

(75) Inventors: Sung-Chul Hong, Seoul (KR); Byung-Duck Park, Anyang (KR); Kyoung-Taek Lim, Anyang (KR); Sang-Chul Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 220 days.

This patent is subject to a terminal disclaimer.

(21) Appl. No.: 12/909,815

(22) Filed: Oct. 21, 2010

(65) Prior Publication Data

US 2011/0034214 A1    Feb. 10, 2011

Related U.S. Application Data

(63) Continuation of application No. 12/032,468, filed on Feb. 15, 2008, now Pat. No. 8,280,446.

(30) Foreign Application Priority Data

Jul. 10, 2007    (KR) .......................... 10-2007-0069332

(51) Int. Cl.
*H03J 7/32* (2006.01)
*H04B 1/18* (2006.01)
*H04M 1/00* (2006.01)

(52) U.S. Cl.
USPC ........ 455/566; 455/145; 455/158.4; 345/173; 345/1.1; 379/142.17; 379/428.03

(58) Field of Classification Search
USPC ................. 455/414.1, 554.2, 556.2, 566, 145, 455/158.4; 345/173, 1.1, 30; 379/29.1, 93.17, 379/122, 136, 142.17, 144.08, 167.12, 201.04, 379/247, 428.03, 433.04, 93.19, 916
See application file for complete search history.

(56) References Cited

U.S. PATENT DOCUMENTS 7,331,516 B2    2/2008   Hwang et al.
8,280,446 B2 *  10/2012  Hong et al. .................... 455/566

(Continued)

FOREIGN PATENT DOCUMENTS

CN    1949905     4/2007
DE    60200191    6/2004

(Continued)

OTHER PUBLICATIONS

Grundlagen: Alles uber Smartphones, "Touchscreen, Tastatur oder Joystick," http://www.chip.de/artikel/Grundlagen-Alles-ueber-Smartphones-4_19547431.html, Apr. 2006, 4 pages.

(Continued)

*Primary Examiner* — Andrew Wendell
(74) *Attorney, Agent, or Firm* — Lee, Hong, Degerman, Kang & Waimey

(57) ABSTRACT

A mobile terminal having an input device that performs an input operation in a touch manner is provided. The mobile terminal includes a first display module, a second display module located adjacent to the first display module, an integrated window located an outer portion of the first and second display modules, and a touch sensing unit located between the window and the second display module for sensing a touch applied to the window and applying an input signal. Marks for guiding input content can be varied and high capacity and high-density multimedia or communication information can be easily and quickly accessed or executed.

22 Claims, 11 Drawing Sheets

U.S. PATENT DOCUMENTS

| | | |
|---|---|---|
| 2006/0187211 A1 | 8/2006 | Uusitalo et al. |
| 2006/0220077 A1 | 10/2006 | Hayashi et al. |
| 2007/0152983 A1 | 7/2007 | McKillop et al. |
| 2008/0062148 A1* | 3/2008 | Hotelling et al. ............ 345/174 |
| 2008/0309634 A1 | 12/2008 | Hotelling et al. |
| 2009/0022428 A1 | 1/2009 | Lee et al. |
| 2009/0197648 A1* | 8/2009 | Cheon et al. ................. 455/566 |
| 2010/0275033 A1 | 10/2010 | Gillespie et al. |
| 2011/0034214 A1 | 2/2011 | Hong et al. |

FOREIGN PATENT DOCUMENTS

| | | |
|---|---|---|
| EP | 0817110 | 1/1998 |
| EP | 0924915 | 6/1999 |
| EP | 1292086 | 3/2003 |
| EP | 1758345 | 2/2007 |
| JP | 2003-256140 | 9/2003 |
| KR | 10-2003-0032544 | 4/2003 |
| KR | 10-2007-0020510 | 2/2007 |

OTHER PUBLICATIONS

German Patent and Trademark Office Application No. 102008009954.6, Office Action dated Feb. 8, 2013, 10 pages.

Korean Intellectual Property Office Application Serial No. 10-2007-0069332, Office Action dated Apr. 17, 2013, 6 pages.

* cited by examiner

MOBILE TERMINAL HAVING TOUCH INPUT DEVICE

CROSS-REFERENCE TO RELATED APPLICATIONS

This application is a continuation of U.S. application Ser. No. 12/032,468, filed Feb. 15, 2008, now U.S. Pat. No. 8,280,446, which pursuant to 35 U.S.C. §119(a), claims the benefit of earlier filing date and right of priority to Korean Patent Application No. 10-2007-0069332, filed on Jul. 10, 2007, the contents of which are incorporated by reference herein in its entirety.

FIELD OF THE INVENTION

The present invention relates to a mobile terminal, and specifically, to a mobile terminal having an input device that performs inputting in a touch manner.

DESCRIPTION OF THE RELATED ART

A mobile terminal is a mobile device that can be portable and have one or more functions such as voice and video call communication, inputting and outputting information, and storing data. With such diversified functions, the mobile terminal provides complicated functions such as capturing images or video, reproducing music or video files, playing games, or receiving broadcasts. By comprehensively and collectively implementing such diversified functions, the mobile terminal may be embodied in the form of a multimedia player.

Various attempts are being made to implement such multimedia player functions, which require sufficient hardware or software support. For example, a user interface environment allowing users to easily and conveniently search or select a function is being developed. Mobile terminals with desirable portability and various designs are being developed since users consider a mobile terminal to be a personal portable device that may express their personality.

An input device typically mounted on the mobile terminal, such as a keyboard, generally has a form that does not allow the marks of respective keys to be changed, thereby making it difficult to display input content according to each mode of the mobile terminal. Additionally, indications of multiple marks on the keys of a single keypad may degrade the external appearance.

SUMMARY OF THE INVENTION

In one aspect of the present invention, a mobile terminal is provided. The mobile terminal includes a first display module for displaying first information, a second display module located adjacent to the first display module for displaying second information, an integrated window located at an outer portion of the first display module and second display module, a touch sensing unit for sensing a touch applied to the integrated window and generating an signal according to the sensed touch, the touch sensing unit located between the integrated window and the second display module and a controller for controlling the mobile terminal according to the generated signal.

It is contemplated that the integrated window is formed of a transmissive panel having an area that covers the first display module and the second display module. It is further contemplated that a cover layer is provided at an inner side of the integrated window to partition the first display module and second display module, the cover layer covering extended edges of the first display module and the second display module.

It is contemplated that the touch-sensing unit is formed as a film with a size corresponding to the integrated window. It is further contemplated that the controller controls the second display module to output a mark set selected from a plurality of mark sets includes at least one of numbers, characters and symbols, each of the plurality of mark sets related to controlling the mobile terminal according to a mode of the mobile terminal.

It is contemplated that the first display module and the second display module each output at least one task selected from a plurality of tasks, the task output by the first display module and the task output by the second display module simultaneously executed. It is further contemplated that a generated signal related to a dragged target mark is searched when a touch applied on a region of the second display module is continuously dragged to a region of the first display module.

It is contemplated that the region of the first display module and the region of the second display module has the same height. It is further contemplated that the mobile terminal includes a first body and a second body slidably movable with respect to the first body, wherein the first body includes the first display module, the second display module, the integrated window and the touch sensing unit and the second body includes an input device for performing an input operation in a push manner. Preferably, the mobile terminal includes a first body and a second body, the second body rotatable in a direction of a first axis such that it may be folded or unfolded with respect to the first body and rotatable in a second direction perpendicular to the first axis, and wherein the first body includes the first display module, the second display module, the integrated window and the touch sensing unit and the second body includes an input device for performing an input operation in a push manner.

In another aspect of the present invention, a method for controlling a mobile terminal is provided. The method includes displaying first information on a first display module, displaying second information on a second display module located adjacent to the first display module, sensing a touch applied to an integrated window located at an outer portion of the first display module and second display module, generating a signal according to the sensed touch and controlling the mobile terminal according to the generated signal.

It is contemplated that the integrated window is formed of a transmissive panel having an area that covers the first display module and the second display module. It is further contemplated that the method includes outputting a mark set on the second display module, the mark set selected from a plurality of mark sets including at least one of numbers, characters and symbols, each of the plurality of mark sets related to controlling the mobile terminal according to a mode of the mobile terminal.

It is contemplated that the method includes outputting at least one task on the first display module, the at least one task selected from a plurality of tasks and outputting at least one task on the second display module, the at least one task selected from a plurality of tasks, wherein the at least one task output by the first display module and the at least one task output by the second display module are simultaneously executed. It is further contemplated that the method includes searching an generated signal related to a dragged target mark when a touch applied on a region of the second display module is continuously dragged to a region of the first display module. Preferably, the region of the first display module and the region of the second display module have the same height.

In another aspect of the present invention, a mobile terminal is provided. The mobile terminal includes a first display module for displaying first information, a second display module located adjacent to the first display module for displaying second information, an integrated window located at an outer portion of the first display module and second display module, a touch sensing unit for sensing a touch applied to the integrated window and generating an signal according to the sensed touch, the touch sensing unit located between the integrated window and the second display module and a controller for controlling the second display module to output a mark set selected from a plurality of mark sets including at least one of numbers, characters and symbols, each of the plurality of mark sets related to controlling the mobile terminal according to a mode of the mobile terminal and controlling the mobile terminal according to the generated signal and the mode of the mobile terminal.

It is contemplated that the first display module and the second display module each output at least one task selected from a plurality of tasks, the task output by the first display module and the task output by the second display module simultaneously executed. It is further contemplated that the touch sensing unit is formed as a film with a size corresponding to the integrated window and a generated signal related to a dragged target mark is searched when a touch applied on a region of the second display module is continuously dragged to a region of the first display module. Preferably, the mobile terminal includes a first body and a second body, the first body including the first display module, the second display module, the integrated window and the touch sensing unit and the second body including an input device for performing an input operation in a push manner, wherein the second body is either slidably movable with respect to the first body or rotatable in a direction of a first axis such that it may be folded or unfolded with respect to the first body and rotatable in a second direction perpendicular to the first axis.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 1:
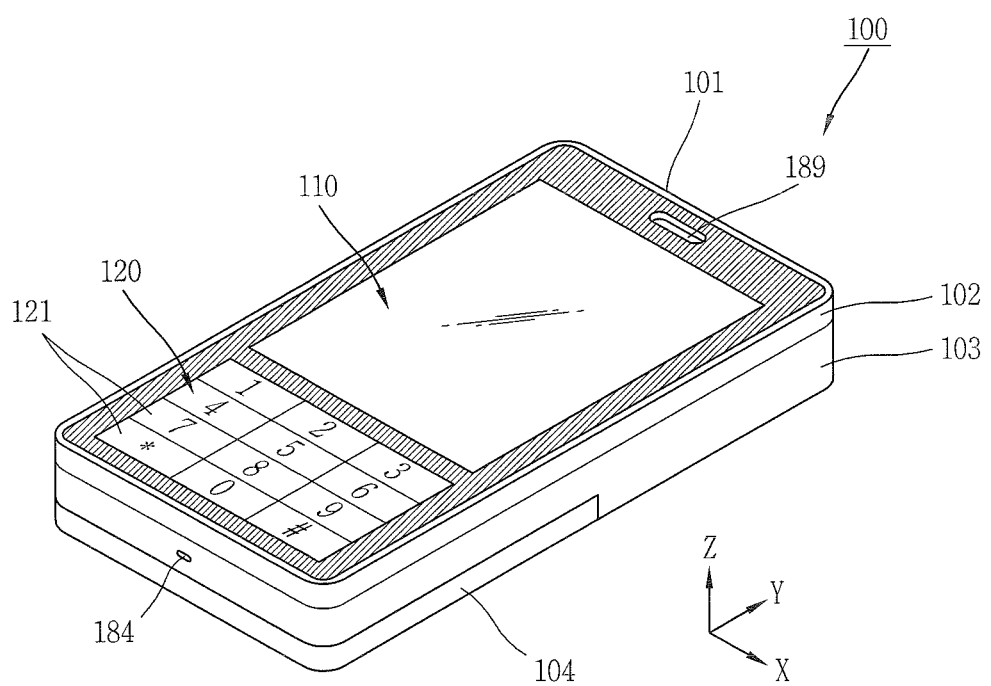
FIG. 1 is a perspective view of a front side of a mobile terminal according to one embodiment of the present invention.

A mobile terminal according to the present invention will now be described in detail with reference to the accompanying drawings. FIG. 1 is a perspective view of a front side of a mobile terminal 100 according to one embodiment of the present invention.

As illustrated in FIG. 1, the mobile terminal 100 includes a terminal body 101 that forms the external appearance and contains components. The terminal body 101 may include a front case 102 and a rear case 103 between which various elements or components are accommodated.

A display unit 110 for outputting visual information is configured on a front surface of the terminal body 101 and an input device 120 for inputting information is mounted at a lower side of the display unit. The front side refers to the 'Z' direction and the upper side refers to the 'Y' direction in FIG. 1. The display unit 110 may output numbers, text, or images that are pre-set, stored or input in an arbitrary mode of the mobile terminal 100.

The input device 120 may include marks 121 combined with a set of characters, numbers or graph images that may be changeable. Specifically, the marks may be changed according to a mode of the mobile terminal 100. With reference to FIG. 1, the marks may include numbers for inputting telephone numbers when the mobile terminal 100 is in a phone call mode.

The input device 120 operates in a touch manner. Specifically, the input device 120 illustrated in FIG. 1 inputs "1" when the '1' key is touched and inputs "3" when the '3' key is touched.

An audio output unit 189 may be located at an upper side of the display unit 110 to output a call sound, various alarm sounds made by a system or music during mobile call communication. An audio input unit 184 may be located at a lower side of the input device 120 to receive a call sound or a sound for recording. The audio input unit 184 may be configured on the front surface or at the side of the terminal body 101.

Figure 2:
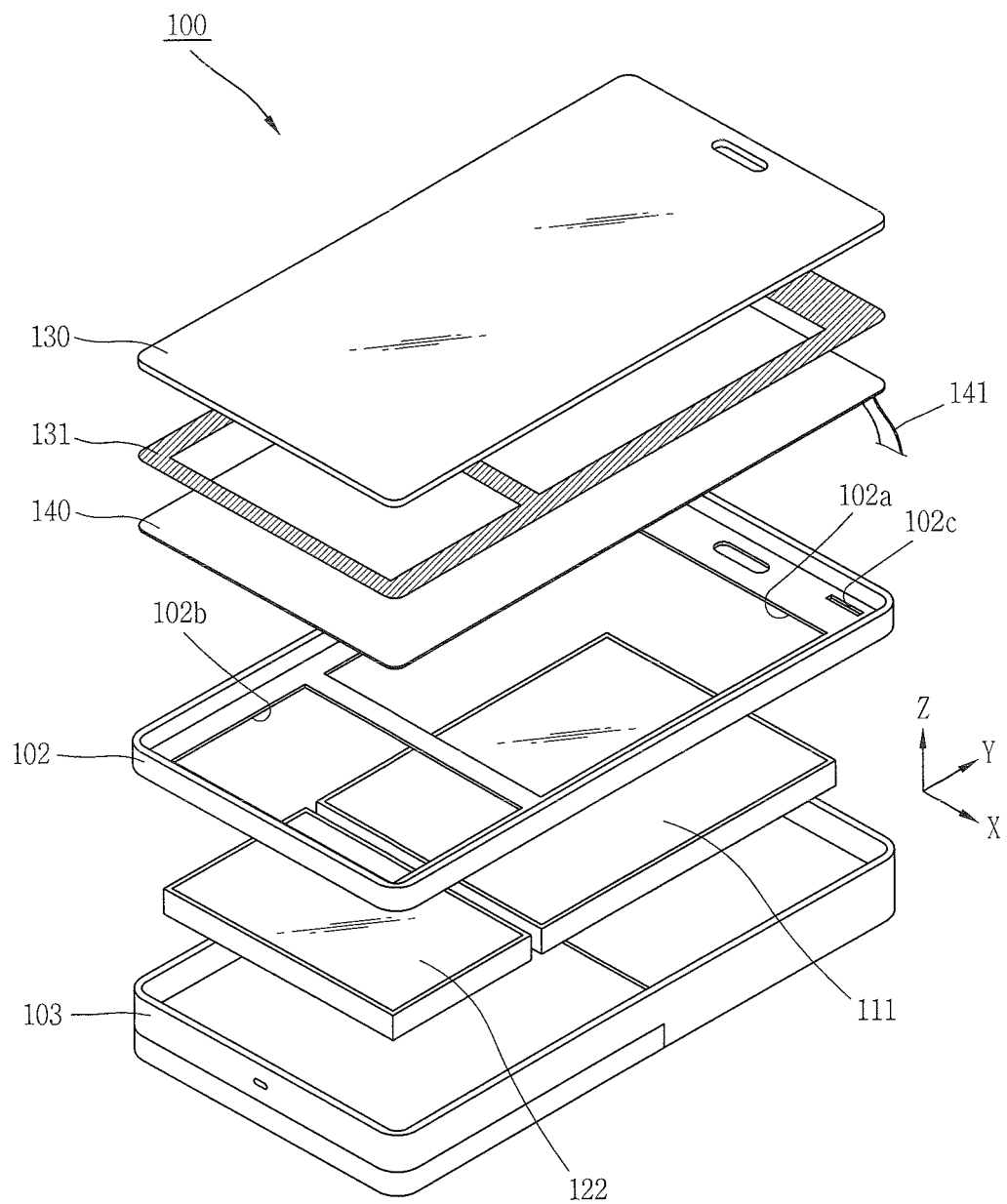
FIG. 2 is an exploded perspective view of the mobile terminal in FIG. 1.
Figure 3:
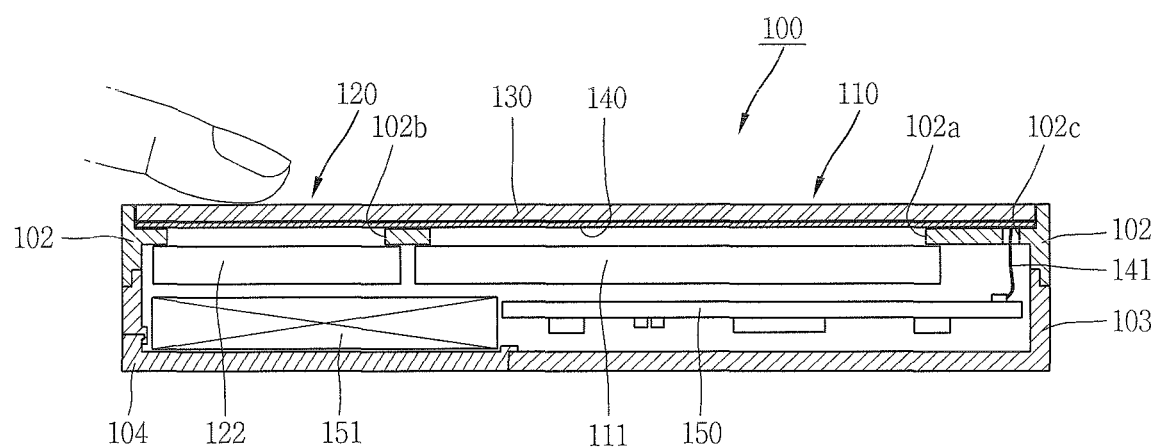
FIG. 3 is a sectional view of the mobile terminal in FIG. 1.

FIG. 2 is an exploded perspective view of the mobile terminal 100 in FIG. 1 and FIG. 3 is a sectional view of the mobile terminal in FIG. 1. As illustrated in FIGS. 2 and 3, the terminal body 101 includes a window 130 that forms a front surface.

The window 130 is integrally configured to cover both the display unit 110 and the input device 120. The window 130 includes a smooth contour to allow continuity of touches from the region of the input device 120 to the region of the display unit 110. For example, the window 130 may have a planar shape or a curved shape. The 'continuity of touches' refers to a continuous movement when a particular mark displayed on the input device 120 is being touched.

A cover layer 131 that is printed or non-transmission processed may partition the display unit 110 and the input device 120, as illustrated in FIG. 2, to prevent internal elements from being seen. The non-transmission processing may be performed by spreading non-transmission pigment on the window 130, by attaching a non-transmissive sheet, or by having a physical configuration such as scratches.

A touch-sensing unit 140 is configured at an inner side of the window 130 to sense a touch applied to the window. The touch-sensing unit 140 includes a portion 141 formed at one side that is connected with a circuit board 150.

The touch-sensing unit 140 may be formed as a conductive film with transmissivity. For example, a thin film made of ITO (Indium Tin Oxide) or CNT (Carbon Nano Tube) may be used. The number of conductive films forming the touch-sensing unit 140 may be adjusted according to a suitable touch scheme, such as a resistive touch scheme that senses a touch by using pressure or a capacitive touch scheme that senses a change in capacitance.

The touch-sensing unit 140 may be configured as a single sheet in contact with a first display module 111 and a second display module 122 located at an inner side of the touch-sensing unit. The touch-sensing unit 140 can be easily combined with the window 130 in this way and deficiency of the product can be reduced.

The window 130 and the touch-sensing unit 140 are mounted on the front case 102 of the terminal body 101. The front case 102 includes through holes 102a and 102b to allow light or an image generated by the first display module of the display unit 110 and the second display module 122 of the input device 120 to be visible.

The first display module 111 of the display unit 110 and the second display module 122 of the input device 120 are located at an inner side of the front case 102 and the rear case 103. The first display module 111 may have an area larger than the area of the second display module 122 and may employ a screen with high resolution compared with the second display module 122. For example, the first display module 111 may include an LCD (Liquid Crystal Display), an OLED (Organic Light Emitting Diode), or a group of LEDs (Light Emitting Diodes).

The second display module 122 may include an LCD, an OLED, a group of LEDs, or an electronic paper (E-paper) that includes the marks 121 provided on the input device 120. The first display module 111 may independently drive the second display module 122. The first display module 111 and the second display module 122 may be mounted on the same mount member to form a single assembly.

A screen image output by the second display module 122 may be associated with a screen image output from the first display module 111 or may be independent from the screen image output from the first display module 111. For example, the first display module 111 and the second display module 122 may output divided portions of a large image in conjunction. On the other hand, a screen image output by the first display module 111 may be shifted to the second display module 122, or vice versa, with the second display module 122 outputting only marks for input or outputting some of the multi-task screen images.

The circuit board 150, on which various components are mounted to operate the mobile terminal 100, may be provided at an inner side of the first and second display modules 111 and 122. The first and second display modules 111 and 122 are electrically connected to the circuit board 150 and output visual information under control of the controller 180 (see FIG. 4).

A FPCB (Flexible PCB) or a cable 141 may connect the touch-sensing unit 140 to the circuit board 150. The FPCB or cable 141 may pass through a passage hole 102c formed at one side of the first through hole 102a of the front case 102 so that it may be hidden from outside.

A power supply unit 151 may be provided at one side of the circuit board 150. As illustrated in FIG. 3, the power supply unit 151 is installed within a power case 104. Alternatively, the power supply unit 151 may be configured as a pack integrated with the power case 104.

As illustrated in FIG. 3, the input device 120 may be manipulated, for example, by the touch of a user's finger. Specifically, when the user's finger touches a particular position on the window 130, a mark corresponding to the touched position is input and then output through the display unit 110 or a corresponding function is performed.

The user's finger may touch the particular position of the input device 120 and move such that it is positioned on another position of the display unit 110. Accordingly, an input operation corresponding to the first touched mark of the input device 120 is performed. Furthermore, an item of the first task being output through the second display module 122 of the input device 120 is executed and the executed content may be output on the display unit 110 as a second task.

Figure 4:
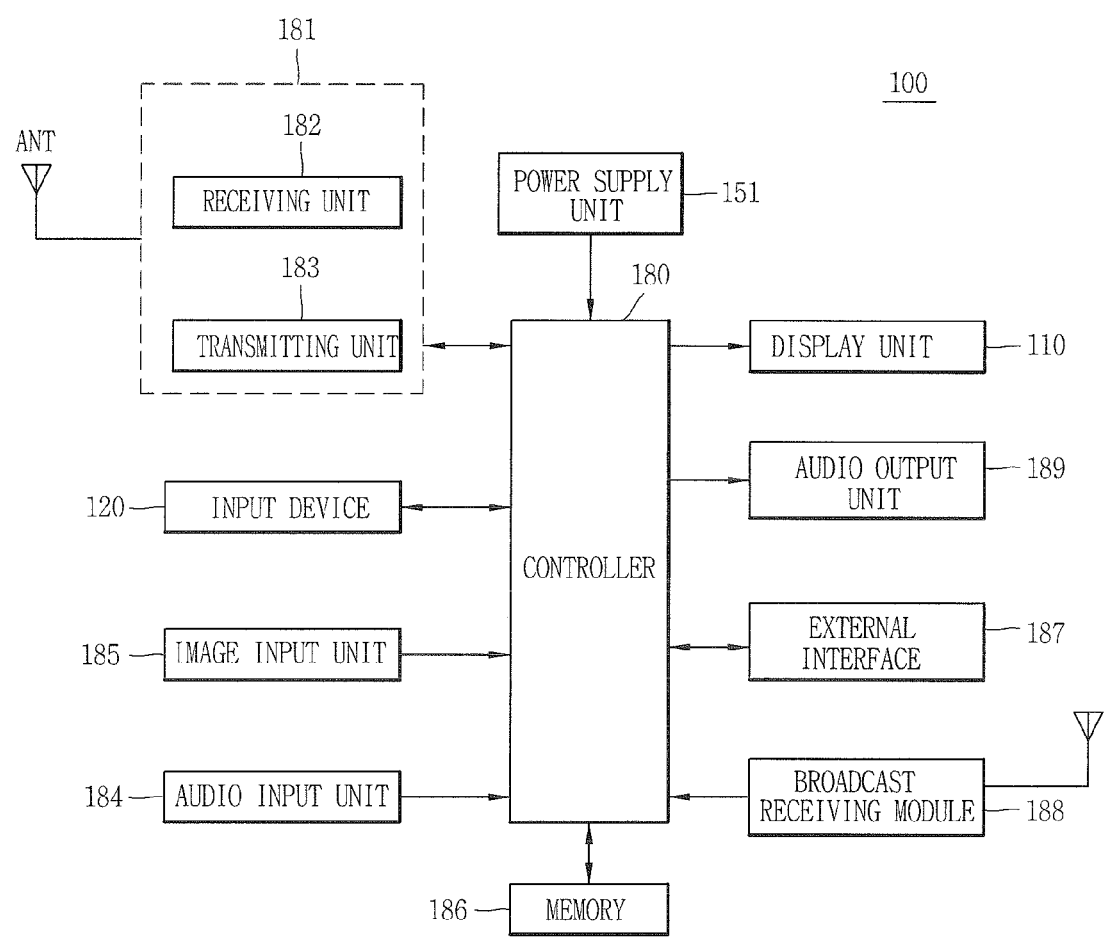
FIG. 4 is a block diagram of a mobile terminal according to an embodiment of the present invention.

FIG. 4 illustrates a block diagram of the mobile terminal 100 according to an embodiment of the present invention. As illustrated in FIG. 4, the mobile terminal 100 includes a wireless communication module 181, the input device 120, an image input unit 185, the audio input unit 184, the display unit 110, the audio output unit 189, an external interface 187, a broadcast receiving module 188, a memory unit 186, the power supply unit 151, and the controller 180. The input device 120 may be configured as shown in FIG. 2 and provide data input by the user to the controller 180 for controlling operations of the mobile terminal 100.

The controller 180 typically controls the general operations of the mobile terminal 100. For example, the controller 180 performs control and processing associated with voice calls, data communications, and video calls. The controller 180 also controls the operation of the input device 120 related to the present invention.

Specifically, the controller 180 may control a screen image output from the second display module 122 as illustrated in FIG. 2 according to a mode of the mobile terminal 100. The controller 180 may also perform a function using the display unit 110, the audio output unit 189, the image input unit 185, or the memory unit 186 upon receiving an input signal via the touch sensing unit 140, which senses a touch applied to the window 130.

The wireless communication module 181 transmits and receives radio signals to and from a mobile communication base station via an antenna ANT. For example, the wireless communication module 181 includes a transmitting unit 183 that handles transmission and reception of voice data, character data, image data and control data under control of the controller 180 and includes a receiving unit 182 that demodulates a received signal under control of the controller 180.

The image input unit 185 may be implemented, for example, as a camera module that captures images or video. When the image input unit 185 is in use, such as in a capture mode or a video call mode, the input device 120 may display marks for controlling various functions of the image input unit on the window 130 under control of the controller 180.

The image input unit 185 processes image data related to still pictures or video obtained by an image sensor. The processed image frames may be converted into image data and output for display on the display unit 110. The image frames processed by the image input unit 185 may be stored in the memory unit 186 or transmitted via the wireless communication module 181 under control of controller 180.

The audio input unit 184 may receive sounds, or audible data, via a microphone in a phone call mode, a recording mode, or a voice recognition mode and process the sounds or audible data into audio data. The processed audio data, such a voice, may be converted into a format transmittable to the mobile communication base station and output via the wireless communication module 181 in the phone call mode. The processed audio data is stored in the memory unit 186 in the recording mode. The audio input unit 184 may implement various types of noise canceling or suppression algorithms in order to cancel or suppress noise generated while receiving or transmitting audio signals.

The display unit 110 may display and output information processed in the mobile terminal 100. For example, when the mobile terminal 100 is in the phone call mode, the display unit 110 may display a User Interface (UI) or a Graphic User Interface (GUI) associated with a call or other communication under control of the controller 180. The display unit 110 may also perform an input operation via the touch-sensing unit 140, as illustrated in FIG. 2.

The audio output unit 189 may convert audio data received from the wireless communication module 181 or stored in the memory unit 186 under control of the controller 180 in a call signal reception mode, the phone call mode, the recording mode, the voice recognition mode, or a broadcast reception mode and output the converted audio data external to the mobile terminal 100. The audio output unit 189 may also provide audible outputs related to a particular function performed by the mobile terminal 100, such as a call signal reception sound or a message reception sound. The audio output unit 189 may include a speaker, a receiver, a buzzer, or a sound-generating device. The controller 180 may change marks for control commands with respect to contents reproduced or output by the audio output unit 189 according to a mode of the mobile terminal 100.

The external interface 187 serves as an interface with at least one external device connected to the mobile terminal 100. For example, the external device may be a wired/wireless headset, an external power charger, a wired/wireless data port, or a card socket for receiving a memory card or a Subscriber Identity Module/User Identity Module (SIM/UIM) card.

The external interface 187 may be used to receive inputs from an external device, such as data, information, or power, and transfer the received inputs to one or more elements within the mobile terminal 100. The external interface 187 may also be used to transfer data from the mobile terminal 100 to an external device. The controller 180 may change the marks for indicating a control command via the input device 120 for connection to an external device according to a mode of the mobile terminal 100 if the mode utilizes the external interface 187.

The memory 186 unit may store, for example, software programs used for processing and control performed by the controller 180 or may temporarily store a phonebook, messages, still images or video that is input or output. The memory unit 186 may also store data input via the input device 120. The memory unit 186 may be a typical hard disk type, card type, card-type memory, such as SD or DX memory, a flash memory, a Random Access Memory (RAM), or a Read-Only Memory (ROM).

The broadcast receiving module 188 may receive a broadcast signal transmitted via a satellite or a ground wave, convert the received broadcast signal into a data format that can be output to the audio output unit 189 and the display unit 110, and output the converted data to the controller 180. The broadcast receiving module 188 also receives supplementary data associated with a broadcast, such as an EPG (Electric Program Guide) or a channel list. The broadcast data and supplementary data converted in the broadcast receiving module 188 may be stored in the memory unit 186.

The controller 180 may present marks for indicating control commands to the user via the input device 120 for receiving a broadcast when the mobile terminal 100 is in a mode that utilizes the broadcast receiving module 188.

Figure 5A:
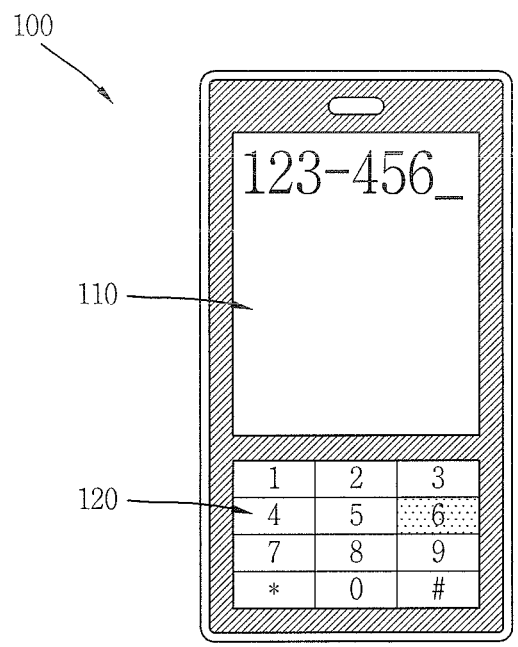
FIGS. 5A to 5E are views showing operation states of a mobile terminal according to an embodiment of the present invention.

FIGS. 5A to 5E are views showing operation states of the mobile terminal 100 according to an embodiment of the present invention. The input device 120 provides telephone numbers of another party to which the user makes a phone call when the mobile terminal 100 is in the phone call mode, as illustrated in FIG. 5A. The numbers, which are input by touching, are output via the display unit 110.

Figure 5B:
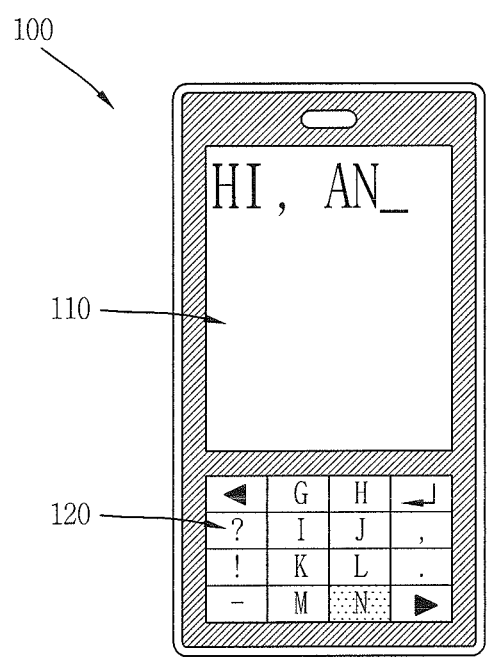

The input device 120 provides marks allocated to keys for inputting or editing when the mobile terminal 100 is in a text edition mode for transmitting a message or creating a memo, as illustrated in FIG. 5B. Characters that are input by touching are output via the display unit 110.

Figure 5C:
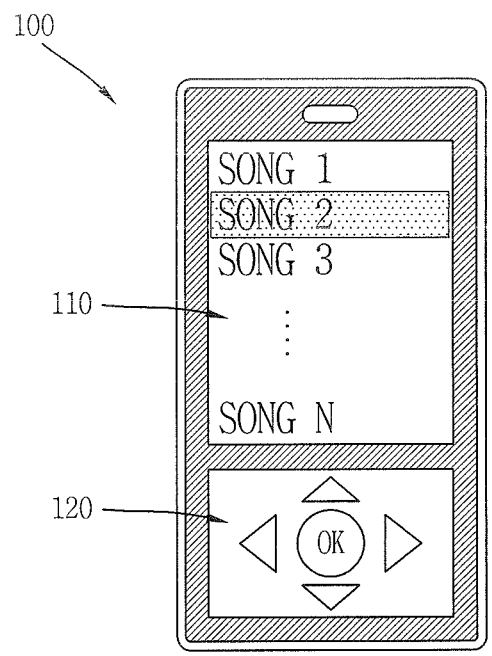

The input device 120 provides marks for indicating a change of a file or to adjust a sound volume when the mobile terminal 100 is in a mode for reproducing a multimedia file such as a music file or a video file, as illustrated in FIG. 5C. A pertinent function corresponding to a mark is performed when the mark is touched.

Figure 5D:
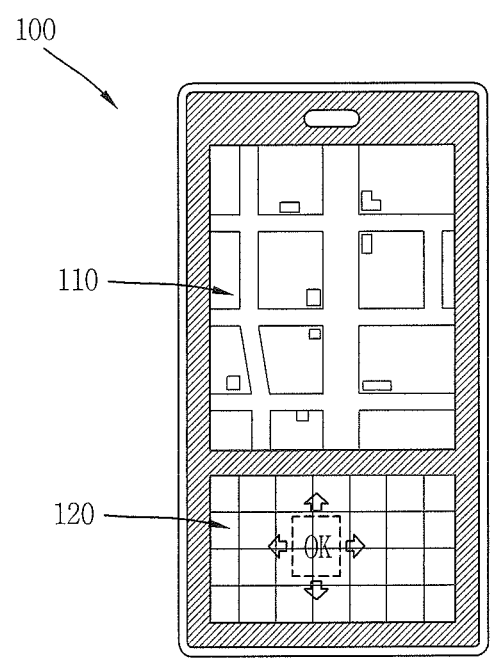

With reference to FIG. 5D, the display unit 110 displays a magnified data image such as a map. The input device 120 outputs a pointer that can be moved to an arbitrary position. When the user's finger is moved in a desired direction while touching the pointer, an image at a portion of the display unit 110 corresponding to the final position of the user's finger is magnified and output to the display unit 110.

Figure 5E:
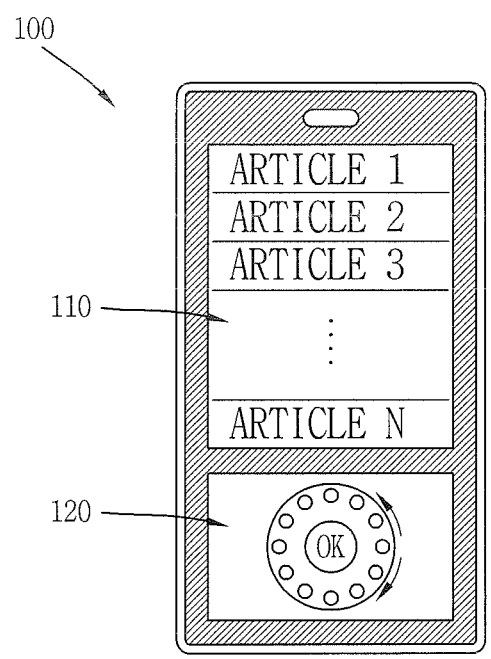

FIG. 5E is a view illustrating a wheel or a dial for fast search and access implemented on the input device 120. A pointer to a list displayed on the display unit 110 can be quickly shifted in a forward or reverse direction when the wheel or dial is rotated by a user's finger.

Figure 6A:
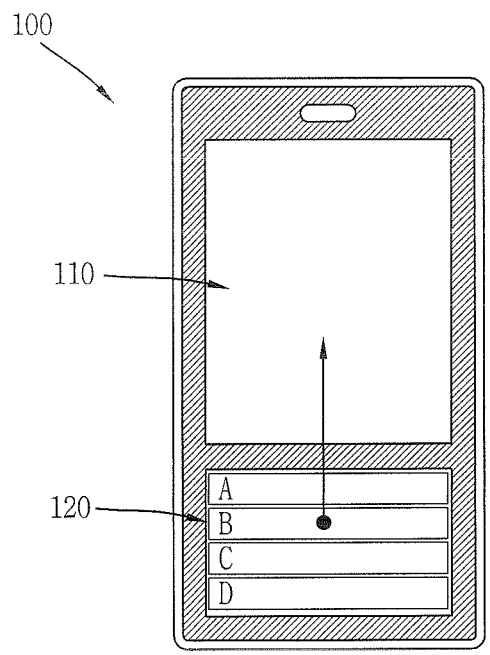
FIGS. 6A and 6B are views showing different operation states of a mobile terminal according to the present invention.
Figure 6B:
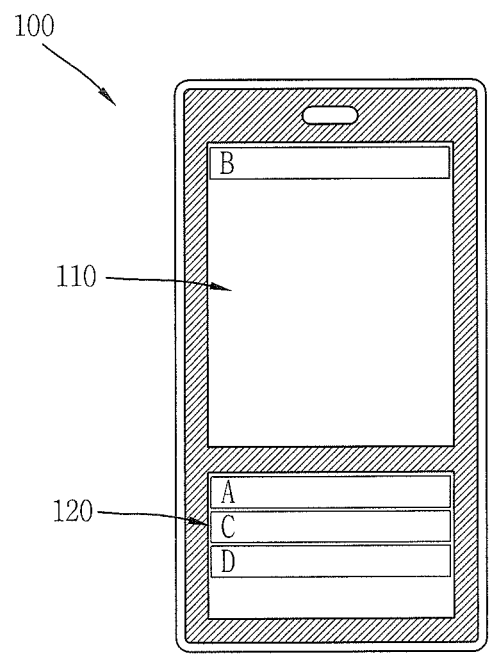

FIGS. 6A and 6B are views illustrating different operation states of the mobile terminal 100 according to the present invention. Different tasks may be executed simultaneously with each task output either through both the display unit 110 and the input device 120 or output only to one of the display unit 110 and the input device 120.

One task visualized on the input device 120 may be associated with another task visualized on the display unit 110 through data movement. For example, a list of items, such as A, B, C and D, that can be manipulated through the input device 120 is output as illustrated in FIG. 6A. When one of the items on the list, such as B, is shifted to the display unit 110 while maintaining a touched state, the shifting is recognized as an input or a control command to a task output via the display unit 110.

FIG. 6B illustrates an item of the input device 120, which has been dragged by touching, being output via the display unit 110. This is a result of continuous touching of the window 130 with the smooth surface between the display unit 110 and the input device 120.

Figure 7:
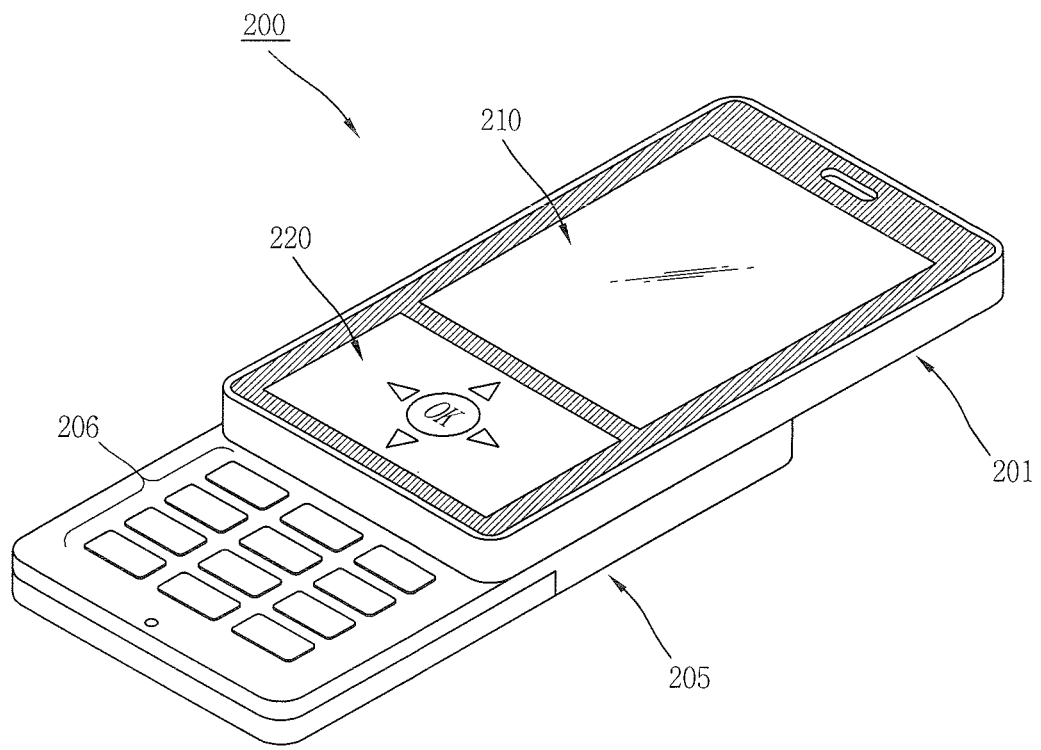
FIG. 7 is a perspective view showing a mobile terminal according to another embodiment of the present invention.

FIG. 7 is a perspective view illustrating a mobile terminal 200 according to another embodiment of the present invention. As illustrated in FIG. 7, the mobile terminal 200 includes a first body 201 and a second body 205 that is configured to be slidable in at least one direction with respect to the first body 201.

Similar to the embodiment illustrated in FIG. 1, the first body 201 includes a display unit 210 and a first input device 220. A state in which the first body 201 overlaps the second body 205 is called a closed configuration. A state in which the first body 201 exposes at least a portion of the second body 205 is called an open configuration.

The first input device 220 may perform an input to the display unit 210 in the closed configuration. Marks indicating content for input or control by touching the first input device 220 may vary according to a mode of the mobile terminal 200.

The second body 205 may include a second input device 206 that has a typical configuration. The second input device 206 is configured to have multiple keys operated by a pressing operation. The second input device 206 may include keys allocated for the input of numbers or characters. With this configuration, the first input device 220 performs a manipulation that is simple or can be executed immediately and numbers or characters may be input mainly via the second input device 206.

Figure 8A:
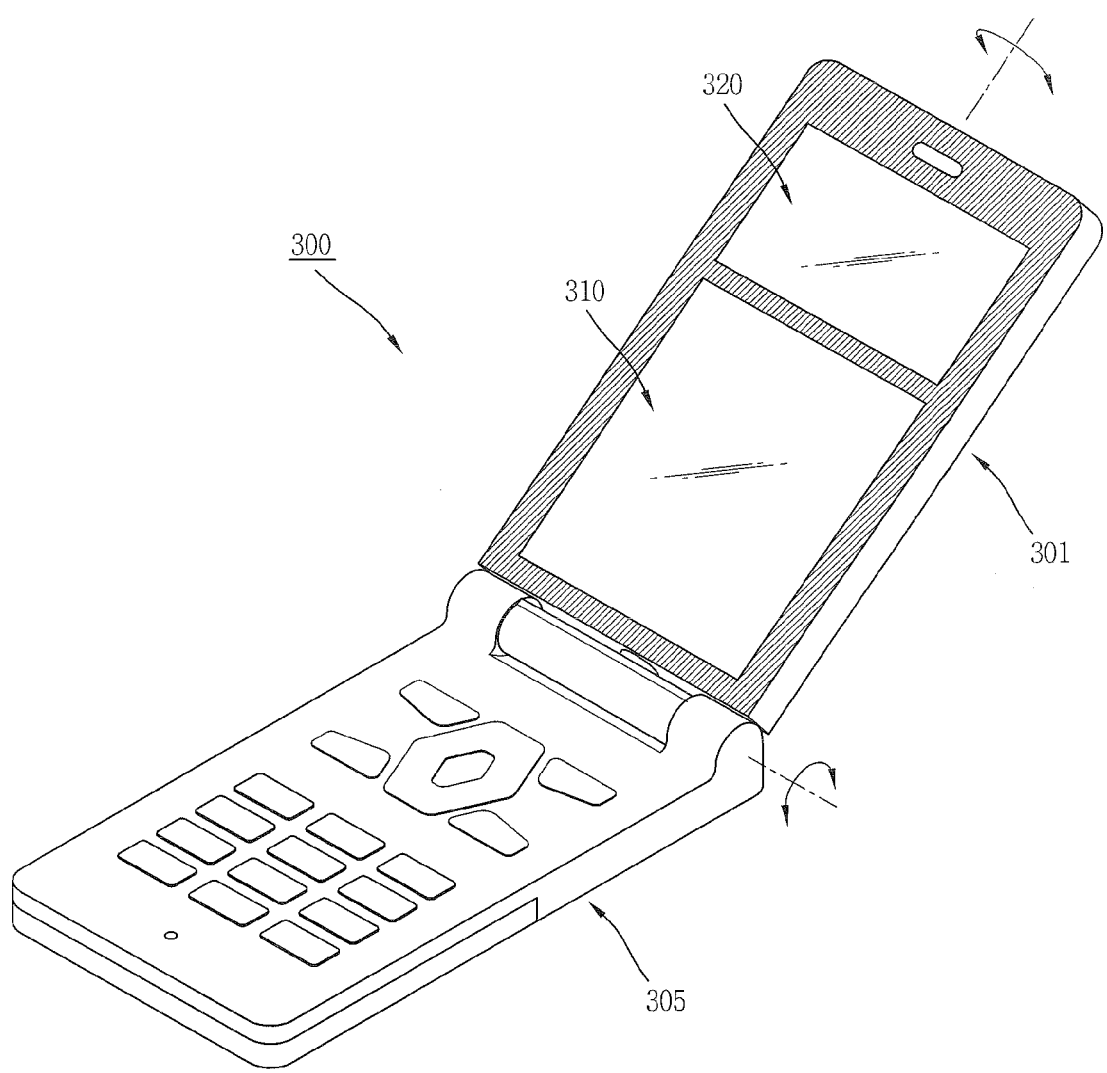
FIG. 8A is a perspective view showing a mobile terminal according to still another embodiment of the present invention.
Figure 8B:
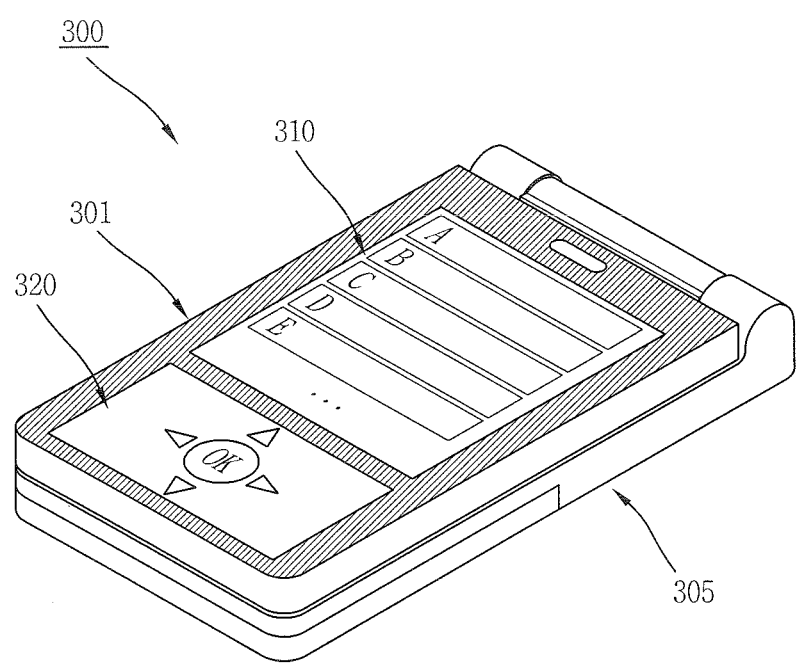
FIG. 8B is a perspective view showing an operation state of the mobile terminal in FIG. 8A.

FIG. 8A is a perspective view showing a mobile terminal 300 according to still another embodiment of the present invention FIG. 8B is a perspective view showing an operation state of the mobile terminal 300.

As illustrated in FIGS. 8A and 8B, the mobile terminal 300 includes a first body 301 and a second body 305. The second body 305 is configured such that at least one side of the second body is rotatable in a direction of a first axis and can be folded or unfolded about the first axis. The first body 301 is rotatable in a direction of a second axis substantially perpendicular to the first axis with respect to the second body 305.

A state in which the first body 301 overlaps the second body 305, as illustrated in FIG. 8B, is called a closed configuration. A state in which the first body 301 is rotated at a certain angle in the direction of the first axis with respect to the second body 305 such that it is unfolded, as illustrated in FIG. 8A, is called a first opened configuration. A state in which the first body is rotated by 180° in the direction of the second axis with respect to the second body such that it is folded is called a second opened configuration.

As illustrated in FIG. 8A, the first body 301 includes a first input device 320 and a display unit 310. The first input device 320 may implement a dual-display in conjunction with the display unit 310 when the first body 301 is in the first opened configuration. The first input device 320 may be used as an input device for manipulating the display unit when the first body 301 is in the second opened configuration.

The mobile terminal of the present invention may be applied to a folder type mobile terminal in which the first body is rotatable by 360° with respect to the second body. The mobile terminal of the present invention includes multiple display modules, with one of the multiple display modules used as a device for touch input such that marks for guiding input content may be varied and high capacity and high density multimedia or communication information may be easily and quickly accessed or executed. Additionally, a simple external appearance can be obtained because the first and second display modules are covered by the same window, thereby avoiding a complicated external appearance and a touch input can be performed on the entire surface.

As the exemplary embodiments of the mobile terminal may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A mobile terminal, comprising:
a housing;
a cover layer comprising an optically opaque region shaped to define a first display region and a second display region;
a single window comprising an optically transmissive material positioned over the cover layer, wherein the single window comprises a first region that generally corresponds to the first display region of the cover layer and a second region that generally corresponds to the second display region of the cover layer, wherein the first and second regions of the single window are structured to permit information to be provided to a user during an operation, wherein the first region and the second region of the single window are coplanar with each other, and wherein each of the first and second regions of the single window is defined as a touch sensitive region;
a touch sensing layer being in contact with the cover layer, the touch sensing layer is structured to receive touch input responsive to user contact at the single window, wherein at least part of the touch sensing layer comprises an optically transmissive material, and wherein the cover layer, the single window, and the touch sensing layer are located in respective planes which are parallel; and
a controller located in the housing and structured to operate in cooperation with the touch input received via the touch sensing layer.

2. The mobile terminal of claim 1, wherein the first and second regions of the single window permit viewing of information generated by an underlying display module located in the housing.

3. The mobile terminal of claim 2, wherein the display module comprises first and second displays respectively associated with the first and second regions of the single window.

4. The mobile terminal of claim 1, wherein the information provided to the user via the second region of the single window is a number, a character, or a symbol.

5. The mobile terminal of claim 1, wherein the cover layer is formed from a non-transmissive pigment.

6. The mobile terminal of claim 1, wherein the cover layer is a non-transmissive sheet.

7. The mobile terminal of claim 1, wherein the touch sensing layer comprises indium tin oxide (ITO) or carbon nano tubes.

8. The mobile terminal of claim 1, wherein the touch sensing layer comprises a pressure sensor or a capacitive sensor.

9. The mobile terminal of claim 1, wherein the cover layer is structured to include a first optically transmissive material which defines the first display region and a second optically transmissive material which defines the second display region.

10. The mobile terminal of claim 1, wherein user contact received at the second region of the single window causes information to be displayed via the first region of the single window.

11. The mobile terminal of claim 1, wherein the touch sensing layer comprises a single layer and generates a signal according to the touch input.

12. The mobile terminal of claim 1, wherein the touch sensing layer has a size corresponding to that of the single window for sensing a touch input applied to the single window.

13. The mobile terminal of claim 2, wherein the display module includes at least one of a Liquid Crystal Display (LCD), an Organic Light Emitting Diode (OLED), or a group of Light Emitting Diodes (LEDs).

14. A display interface for a mobile terminal, the interface comprising:
   a cover layer comprising an optically opaque region shaped to define a first display region and a second display region;
   a single window comprising an optically transmissive material positioned over the cover layer, wherein the single window comprises a first region that generally corresponds to the first display region of the cover layer and a second region that generally corresponds to the second display region of the cover layer, wherein the first region and second region of the single window are coplanar with each other, and wherein each of the first and second regions of the single window is defined as a touch sensitive region; and
   a touch sensing layer structured to receive a touch input responsive to user contact at the single window, and wherein at least part of the touch sensing layer comprises an optically transmissive material,
   wherein the cover layer, the single window, and the touch sensing layer are structured to cooperate with a display module to permit viewing of data provided by the display module, and
   wherein the display module, the cover layer, the single window, and the touch sensing layer are located in respective planes which are parallel.

15. The display interface of claim 14, wherein the data is a number, a character, or a symbol.

16. The display interface of claim 14, wherein the cover layer is formed from a non-transmissive pigment.

17. The display interface of claim 14, wherein the cover layer is a non-transmissive sheet.

18. The display interface of claim 14, wherein the touch sensing layer comprises indium tin oxide (ITO) or carbon nano tubes.

19. The display interface of claim 14, wherein the touch sensing layer comprises a pressure sensor or a capacitive sensor.

20. The display interface of claim 14, wherein the cover layer is structured to include a first optically transmissive material which defines the first display region and a second optically transmissive material which defines the second display region.

21. The display interface of claim 14, wherein user contact received at the second region of the single window causes information to be displayed via only the first region of the single window.

22. The display interface of claim 14, wherein the touch sensing layer comprises a single layer.

* * * * *